Patented Sept. 8, 1953

2,651,660

UNITED STATES PATENT OFFICE 2,651,660

NITROAROMATIC-BENZALTHIOSEMI-CARBAZONES

Hans Schmidt, Wuppertal-Vohwinkel, and Robert Behnisch, Wuppertal-Elberfeld, Germany, assignors to Schenley Industries, Inc., New York, N. Y., a corporation of Delaware No Drawing. Application July 20, 1951, Serial No. 237,836. In Germany July 22, 1950

3 Claims. (Cl. 260—552)

This invention relates generally to the synthesis of organic chemical compounds useful in chemotherapy and, in a more particular sense, it comprises certain novel, nuclearly substituted, benzalthiosemicarbazones having tuberculostatic properties that make them useful agents in treatment of tuberculosis. These new compounds also are useful in the treatment of leprosy and other diseases.

In accordance with this invention, it is found that substituted benzalthiosemicarbazones which may be represented by the following formula, are useful chemotherapeutical agents:

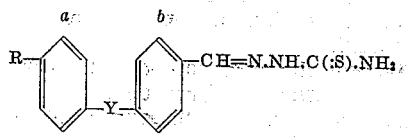

wherein R is a substituent chosen from the group consisting of nitro, amino, and acetylamino and Y links the aromatic nuclei $a$ and $b$, either by a direct valence bond from nuclear carbon to nuclear carbon, or through a divalent group or radical such as —C(:O)—; —S—; and —SO$_2$—.

It will be obvious, upon consideration of the foregoing formula representing the novel compounds of this invention, that these compounds may be regarded as substitution products of thiosemicarbazones of the fundamental binuclear systems diphenylal-4, diphenylsulfoxide-al-4, diphenylsulfide-al-4, and diphenylsulfone-al-4.

To facilitate a better understanding of the subject matter of this invention, and especially to make clear how the compounds of the invention may be easily synthesized, typical processes for the synthesis of several representative compounds will now be described, with the clear understanding, however, that these examples are provided by way of illustration of the invention merely and are not to be construed in any limitative sense.

Example 1

Synthesis of the compound represented by the formula:

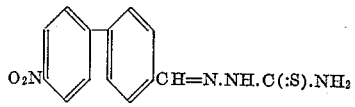

About 2.3 grams of 4-nitro-diphenyl-4'-aldehyde are heated to boiling in 100 cc. of alcohol, to which 2 or 3 drops of glacial acetic acid have been added. A hot solution of 1 gram of thiosemicarbazide in 10 cc. of water is added to the mixture and the resulting solution is boiled for a short period of time. The thiosemicarbazone of 4-nitro-diphenyl-4'-aldehyde precipitates from the reaction mixture even while it is still hot. After cooling and filtering, 2.4 grams of the desired thiosemicarbazone product are obtained as yellow crystals, melting at about 250° C. with decomposition.

The same final product may also be obtained in the following manner:

Approximately 3.3 grams of 4-nitrodiphenyl-4'-aldehydediacetate are boiled for 15 minutes in 100 cc. of alcohol containing 5 cc. of concentrated hydrochloric acid. After neutralizing the solution by addition of 4.5 grams of sodium acetate, a hot solution of 1 gram of thiosemicarbazide in 10 cc. of water is added, then the mixture is diluted with 100 cc. of water, which dissolves the precipitated NaCl, and the solution is filtered. About 3.1 grams of the final product, melting at about 250° C. with decomposition, are thus obtained.

The starting material, 4-nitro-diphenyl-4'-aldehyde, yellow crystals melting at 127° C., may be obtained by conventional methods of organic synthesis, or it may be prepared for instance, by the reaction of 4-nitro-4'-bromomethyl-diphenyl and hexamethylenetetramine in an alcoholic reaction medium. The diacetate of the aldehyde (crystals melting at 144° C.) is produced by oxidizing 4-nitro-4'-methyl-diphenyl with chromic acid in the presence of acetic anhydride at low temperature.

Example 2

Synthesis of the compound represented by the formula:

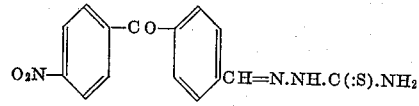

Approximately 3.6 grams of 4-nitro-benzophenone-4'-aldehyde-diacetate, which may be prepared by oxidation of 4-nitro-4'-methyl-benzophenone with chromic acid in a mixture of glacial acetic acid and acetic anhydride to yield crystals melting at 145° C., are heated to boiling in 100 cc. of alcohol containing 5 cc. of hydrochloric acid. After neutralizing the mixture with 4.5 grams of sodium acetate, it is mixed with a hot solution of 1 gram of thiosemicarbazide in 10 cc. of water and the mixture is heated for a brief period of time. After diluting the solution with 100 cc. of water, it is filtered yielding about 3.2 grams of residue, p-nitro-benzophenone-aldehyde-thiosemicarbazone, melting at 232–233° C. with decomposition.

Example 3

Synthesis of the compound represented by the formula:

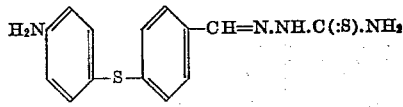

and the N-acetyl derivative of this compound.

About 26 grams of 4-acetylamino-diphenylsulfide-4'-aldehyde, which may be obtained as colorless crystals by reduction of 4-acetylamino-4'-cyano-diphenyl- sulfide, using stannous chloride according to the method of Stephen, are boiled for several hours with 12 grams of thiosemicarbazide in a mixture of 250 cc. of alcohol, 25 cc. of water and 2 cc. of glacial acetic acid. The thiosemicarbazone final product begins to precipitate slowly while the mixture is still hot. After cooling, the mixture is filtered and the residue is recrystallized from dilute alcohol. The product which is obtained as colorless crystals, melting at 216° C., yields a dark-green copper complex salt with soluble copper compounds. By saponification of the acetyl group, using an aqueous alcoholic caustic soda solution of 10% strength, the free base, 4-amino-diphenylsulfide-4'-aldehyde thiosemicarbazone is obtained as colorless crystals which may be recrystallized from alcohol.

Example 4

Synthesis of the compound represented by the formula:

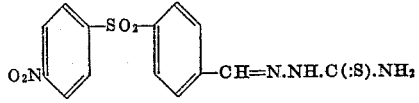

Approximately 4 grams of 4-nitro-diphenyl-sulfone-4'-aldehyde diacetate are boiled for several hours with 1.5 grams of thiosemicarbazide in 250 cc. of ethanol containing 0.5 cc. of 1N-hydrochloric acid. The thiosemicarbazone final product formed slowly precipitates as light-yellow crystals which, after filtering, are recrystallized from a larger quantity of alcohol and have a melting point of 245° C. (with decomposition).

Example 5

Synthesis of the compound represented by the formula:

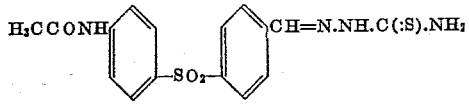

About 3 grams of 4-acetylamino-diphenyl-sulfone-4'-aldehyde, which may be obtained as crystals, melting at 204° C. by reacting the potassium salt of 4-acetylamino-benzene-sulfinic acid and 4-chloro-benzaldehyde at 160° C., are boiled with 1.5 grams of thiosemicarbazide for 4 hours in a mixture of 25 cc. of alcohol, 5 cc. of water and 0.5 cc. of glacial acetic acid. The resulting thiosemicarbazone final product, which begins to precipitate while the mixture is still hot, is removed by filtering the mixture, after cooling, and it is recrystallized from alcohol. The final product is obtained as colorless leaflets, melting at 185° C.

Having thus described the subject matter of this invention, what it is desired to secure by Letters Patent is:

1. A compound represented by the formula:

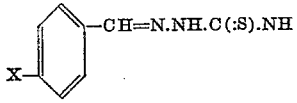

wherein X is a substituent radical chosen from the group consisting of 4-nitro-phenyl and 4-nitro-benzoyl.

2. The new chemical compound: 4-(4'-nitrophenyl)-benzalthiosemicarbazone.

3. The new chemical compound: 4-(4'-nitrobenzoyl)-benzalthiosemicarbazone.

HANS SCHMIDT.
ROBERT BEHNISCH.

References Cited in the file of this patent

FOREIGN PATENTS

| Number | Country | Date |
|---|---|---|
| J. 76,219 | Germany | 1949 |
| J. 76,679 | Germany | 1949 |

OTHER REFERENCES

Domagk: "Naturwissenschaften," vol. 33, November 30, 1946, p. 315.